Oct. 4, 1932.   H. H. CANNON   1,881,044
METHOD OF NEUTRALIZING ACID TREATED OILS
Filed July 8, 1929

HUGH HARLEY CANNON
INVENTOR

Paul W. Pretzman
ATTORNEY

Patented Oct. 4, 1932

1,881,044

UNITED STATES PATENT OFFICE

HUGH HARLEY CANNON, OF LOS ANGELES, CALIFORNIA, ASSIGNOR TO CANNON-PRUTZMAN TREATING PROCESSES, LTD., OF LOS ANGELES, CALIFORNIA, A CORPORATION OF CALIFORNIA

METHOD OF NEUTRALIZING ACID TREATED OILS

Application filed July 8, 1929. Serial No. 376,517.

The primary object of my invention is to neutralize petroleum oils which have been treated with sulfuric acid, in a more expeditious and economical manner than has heretofore been possible.

An object of my invention is to avoid the use of aqueous alkaline solutions or the addition of any water to the oil.

An object of my invention is to use solely dry pulverulent reagents capable of at once neutralizing and absorbing the acidic constituents of the oil and which, after they have performed these functions, may be freely filtered out.

My invention is adapted particularly to the neutralization of acid treated gasolines, kerosenes, cracked naphthas and other volatile and nonviscous products of petroleum, but inasmuch as it is also suitable, under some circumstances, for the neutralization of more viscous petroleum products, such as lubricating oils, and of acid treated shale oils and coal tar products, I do not restrict the scope of my invention to the volatile products first named.

Figure 1:
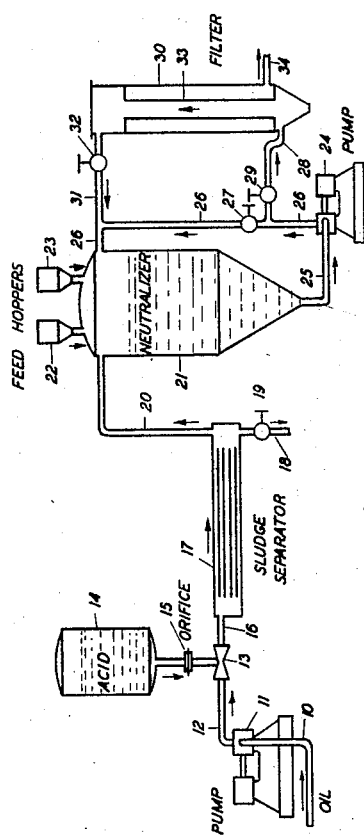
Figure 2:
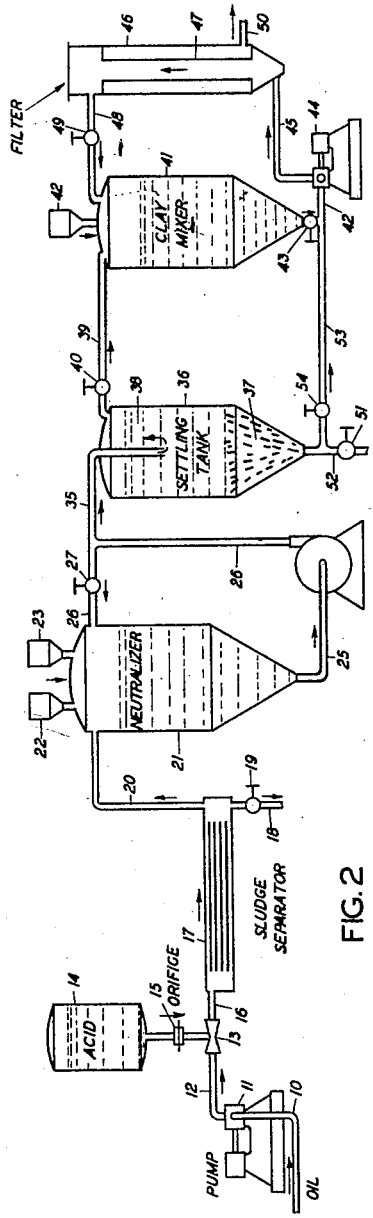

I effect this neutralization in the following manner, which is illustrated in the flow diagrams Figs. 1 and 2 of the attached drawing, in which Fig. 1 illustrates the steps taken when neutralization is to be effected without any treatment of the oil between the neutralizing step and the final filtration step; and Fig. 2 illustrates the steps taken when an adsorbent clay is applied to the oil between the neutralization step and the filtration step.

As my neutralizing method is substantially continuous (it may be made entirely so by providing certain elements of the apparatus in duplicate) it is quite important that the acid oil come to the neutralization step in a condition approaching constancy as regards degree of acidity and freedom from acid tar. I therefore prefer to treat a flow stream of the oil continuously, the acid dose being accurately proportioned to the volume of the oil stream, and to separate the acid sludge from the acidified oil in continuous apparatus.

A suggested method for acid treating is indicated in the attached drawing (Figs. 1 and 2), in which 10 is a pipe communicating with a source of supply of raw oil, 11 is a pump, 12 is a pipe discharging oil under pressure into an ejector 13, 14 is a tank containing acid and 15 is an orifice regulating the flow of acid into the ejector. The ejector produces a close inter-mixture of oil and acid which passes through pipe 16 into a sludge separator 17, from which sludge is drawn through a pipe 18 and valve 19 while sludge-free oil passes through a pipe 20 to the neutralizer 21.

The sludge separator above referred to is the subject of my copending application entitled "Apparatus for separating sludge", Serial No. 340,383, filed February 16, 1929. Otherwise the apparatus and the method described are well known and I do not claim them, the description being illustrative only. Nor do I restrict my invention to this nor to any other specific method of acid treating the oil. The only purpose in the use of continuous apparatus for treating and desludging is to reduce the amount of labor required for manipulating and regulating the neutralizing apparatus proper. Good results may be had in neutralizing oil treated in batches, particularly if the sludge be drawn off and the oil thereafter mixed and kept in gentle motion while feeding to the neutralizer.

Referring again to Fig. 1 of the drawing, 22 and 23 are feed hoppers or any of the well known devices for feeding measured quantities of dry powders, these hoppers or measuring devices being arranged to introduce the reagent materials into the top of neutralizer 21. A pump 24 having a suction pipe 25 and a discharge pipe 26 controlled by valve 27 withdraws a mixture of oil and reagent powder from the bottom of the neutralizer and returns it over the top, thus keeping the contents of the neutralizer in suspension. This circulation should be performed at a relatively rapid rate, and if preferred the pump may take suction from below the liquid level in the upper portion of the tank and return into the bottom.

A branch pipe 28 controlled by a valve 29 admits a portion of this circulating flow to a vertical tubular (or any other) filter press 30. A pipe 31 controlled by valve 32 permits a portion of the suspension fed to the press to return to the top of the neutralizer. A part of the solids contained in the filter feed stream is deposited inside the filtering tube 33 while a corresponding quantity of clarified neutralized oil is discharged through pipe 34 to a place of storage or disposal not shown.

In manipulating this apparatus pump 24 is adjusted in speed to maintain the desired rapidity of circulation through the neutralizer, valve 32 is adjusted to maintain the desired rapidity of circulation through the press, and valve 27 is adjusted from time to time to maintain and to increase the pressure within the press. Valve 29 is a stop valve only and is normally wide open.

The neutralization of the acid oil is effected by time contact of the oil with a mixture of powdered reagent materials. This mixture consists essentially of an alkaline material, capable of neutralizing sulfuric and sulfonic acids, with an absorbent material, capable of absorbing into its pores any finely disseminated acid sludge as well as the salts resulting from the chemical neutralization. The absorbent material may also be an adsorbent, but is not necessarily so, my preferred material being diatomaceous earth which has practically no adsorptive properties as regards coloring matter or other impurities in solution in petroleum and similar oils.

Where it is desirable or necessary to give the oil a bleaching treatment with an adsorbent such as bleaching clay I prefer to give this treatment in a separate step, following the neutralization proper, as will be hereinafter described.

As a specific alkaline reagent I prefer to use sodium carbonate (commercial soda ash), which is both cheap and effective, though it is possible to use any of the alkali hydrates or carbonates or of the alkali-earth hydrates. The latter, though effective neutralizing agents, have a tendency to retard filtration and require excessive proportions of the absorbent earth; sodium hydrate is difficult to reduce to the required degree of comminution, and the other materials named are more costly, but all of these may be useful under appropriate conditions.

As a specific absorbent material I prefer to use a siliceous earth, known commercially as diatomaceous earth, infusorial earth and kieselguhr. The lightest and most porous grades are more economical than the cheaper and more earthy varieties, and a calcined earth is to be preferred to a raw earth. Light and highly porous clays or magnesian minerals are also suited to the purposes of my invention, though less so than the siliceous earths.

The quantity of the alkaline agent required in any specific case cannot be reduced to a general figure. Obviously it will vary directly with the acidity of the oil, and it will also vary inversely with the time of contact, with the reactivity of the alkali used and with the degree of comminution of the alkali, because reaction takes place only on the surface of a solid particle. As the treatment is a continuous one it is quite sufficient for all purposes of operative control to start feeding an excess of alkali and to gradually cut down the dosage to the point where the press effluent shows signs of going over to the acid side. The test should be applied to the press effluent and not to the contents of the neutralizer, which will usually be slightly acid.

The purpose of the absorbent earth is a dual one. It takes up mechanically and withdraws from contact with the alkali the minute particles of sludge which pass through the most effective sludge separating apparatus and which, if neutralized in contact with the oil, tend to become oil-soluble and to cause discoloration of the final product. It also attaches and draws into its pores grains or flakes or certain reaction products which, if allowed to remain freely suspended in the oil, tend to clog the filter cake and render filtration tedious and difficult.

The quantity of absorbent earth required varies over a wide range with the nature of the earth, the alkali and the oil. When using sodium carbonate and a high grade of siliceous earth, a weight of earth equal to one-tenth the weight of the alkali is usually sufficient. If the much heavier aluminous clays are used the weight required may be from half the weight of the alkali to an equal weight. The rule in practice is to use the smallest quantity of earth consistent with obtaining as press effluent a brilliant oil, and with maintaining the free filtering properties of the cake. If the flow rate through the filter is, or becomes, too low before the press is sufficiently filled, the difficulty may in almost all cases be corrected by feeding a larger proportion of earth. An excess of earth is never harmful except as it is wasteful.

It has been stated that these two materials should be in the form of dry powders, but the word "dry" may not be taken to mean anhydrous. A desirable state of dryness is that at which each of the powders is entirely incoherent, and this physical condition is consistent with the presence in the alkali of from 2% to 5% of water and in the diatomaceous earth of as much as 15% of water. The normal water content of the earth is available for supplying water which may be required for the reaction between acidic constituents and dry alkali, and in many cases the reaction may be accelerated and results improved by the addition to the reagent of as much water as it will tolerate without showing signs of coherence. A greater quantity will render the filter cake impermeable.

It is important that the alkali and the earth be fed to the neutralizing vessel simultaneously. They may, as a matter of convenience and proper control, be mixed in advance in the desired proportion and fed into the oil in a single stream. The same results are had, with rather less convenience, by feeding two properly proportioned separate streams. They may even be added in alternate separate doses, provided only, that each dose be of such small quantity as not seriously to alter the ratio between earth : alkali : oil in the neutralizing vessel. In other words, the feed should be substantially but need not be strictly continuous and simultaneous.

In case it is desired to treat the neutralized oil with clay or other adsorbent I make a suitable addition to the above described process. Referring to Fig. 2, the drawing and the description are the same as above, up to and including the circulating pump 24 and its suction pipe 25, discharge pipe 26 and control valve 27. Pipe 26, however, branches into a pipe 35 leading into the medial portion of a substantially closed settling tank 36, having preferably a conical bottom. In this tank the bulk of the spent reagent subsides to a layer of slush indicated at 37, leaving a layer of relatively clear oil indicated at 38. This oil flows forward through a pipe 39 controlled by a valve 40 into a clay mixing tank 41 which is provided with a feed hopper (or equivalent device) 42 for measuring and introducing the clay.

From the bottom of the mixer a pipe 42 provided with a valve 43 leads to the suction of a pump 44 which discharges through a pipe 45 into a filter 46. The clay-containing oil is circulated rapidly through the filtering tube 47, returning to the mixer through a pipe 48 having a pressure controlling valve 49. In passing through the tube under pressure a part of the liquid constituent passes through the wall of the tube and flows from the effluent pipe 50 as a neutralized and purified oil. The cake of clay containing some spent reagent which accumulates in the tube is discharged at intervals in the usual manner.

By providing filter presses in duplicate this operation, like the foregoing, may be made strictly continuous.

The layer of spent reagent and oil slush which collects in the bottom of settling tank 36 may be withdrawn by opening drain valve 51 in pipe 52. This is unduly wasteful of oil and I prefer to provide a branch pipe 53 having a valve 54 and communicating with the suction of pump 44. Through this pipe the slush may be pumped, at suitable intervals, into the same filter press. If the clay is to be recovered and reused the slush should be pumped into an empty press and its cake kept separate. If clay recovery is not desired it is better to precoat the press cloth with clay and finish filling the press with reagent from the slush. Either method effects a substantially complete recovery of oil from the spent reagent without any extraneous operation or apparatus.

The essence of my invention lies in simultaneously treating an acidified oil with a solid alkaline powder and a solid absorbent powder. When these reagents are applied in this manner their action is complementary, the absorbent taking up the sludge particles which would otherwise be neutralized by the alkali and thus preventing the re-solution of sludge in the oil and also acting as an absorbent for alkali reaction products and as a filter aid, while the alkali neutralizes the dissolved acid bodies and ensures complete neutrality, which is difficult to obtain by the use of the absorbent alone. The combined reagent is much more effecting and economical than either used separately or than the two applied seriatum.

When applied in a continuous process, as above described, my invention lies in the following steps:—(a) in providing a flow-stream of acidified oil from which as much as possible of the acid and sludge has previously been removed (b) in feeding into this stream a mixed or double reagent composed of a solid powdered alkaline material and a solid powdered absorbent material, the feed of the two materials being substantially constant and substantially simultaneous (c) in retarding the stream at this feeding point to allow time for the completion of the reaction, maintaining the solids in suspension during this time, and (d) in separating the spent mixture of reagents from the neutralized oils by mechanical means, and specifically by filtration, without the addition of water.

The essence of my invention may also be given a practical application in a discontinuous process which is the substantial equivalent of the continuous process above described and in which the steps are (a) to accumulate a batch of the acidified oil (b) to treat this batch with a dry powdered alkaline material and a dry powdered absorbent material, added simultaneously (c) to maintain intermixture to the completion of the reaction and (d) to separate the spent reagent from the neutralized oil by mechanical means, specifically by filtration, without the addition of water for washing. This method is much less convenient and desirable than my described continuous process, but produces the same final result.

It is not compatible with the spirit of my invention to wash out the spent reagent material and the reaction products with water, as the action of water on the absorbent material is to displace and throw back into the oil any absorbed bodies, thereby vitiating the results produced by my dry treatment. After the complete removal of solids, as by filtration, water may be mixed with the oil with impunity, should it be desired to follow neutralization with any aqueous treatment.

I claim as my invention:

1. The method of neutralizing an acidified oil which comprises: treating said oil simultaneously with dry powdered sodium carbonate and dry powdered diatomaceous earth; circulating said materials with said oil out of and into a body of said oil until reaction is complete, and separating said materials from said oil by mechanical means.

2. The method of neutralizing an acidified oil which comprises: treating said oil simultaneously with dry powdered sodium carbonate and dry powdered diatomaceous earth; circulating said materials with said oil out of and into a body of said oil until reaction is complete, and separating said materials from said oil by filtration.

3. The method of neutralizing an acidified oil which comprises: treating said oil simultaneously with dry powdered sodium carbonate and dry powdered diatomaceous earth; circulating said materials with said oil out of and into a body of said oil until reaction is complete, and separating said materials from said oil by subsidence followed by filtration.

4. The method of neutralizing an acidified oil which comprises: treating said oil simultaneously with dry powdered sodium carbonate and dry powdered diatomaceous earth, circulating said materials with said oil out of and into a body of said oil until reaction is complete; separating said materials from said oil by subsidence; adding a further quantity of dry powdered absorbent material and separating said material from said oil by filtration.

5. The continuous method of neutralizing an acidified oil which comprises: establishing a flow stream of said oil; materially retarding said flow stream to form a body of said oil; substantially simultaneously feeding into said body dry powdered sodium carbonate and dry powdered diatomaceous earth; circulating said materials with said oil through said body until reaction is complete, and continuously withdrawing a stream of said oil from said body and separating said materials from said stream in a spent condition by mechanical means.

6. The continuous method of neutralizing an acidified oil which comprises: establishing a flow stream of said oil; substantially simultaneously feeding into said flow stream dry powdered sodium carbonate and dry powdered diatomaceous earth; circulating said materials with said oil in a closed cycle until reaction is complete, and filtering said materials from said flow stream.

7. The continuous method of neutralizing an acidified oil which comprises: establishing a flow stream of said oil; substantially simultaneously feeding into said flow stream dry powdered sodium carbonate and dry powdered diatomaceous earth; circulating said materials with said oil in a closed cycle until reaction is complete; settling a material proportion of said materials out of said flow stream and filtering the remainder of said materials from said flow stream.

8. The continuous method of neutralizing an acidified oil which comprises: establishing a flow stream of said oil; substantially simultaneously feeding into said flow stream dry powdered sodium carbonate and dry powdered diatomaceous earth; circulating said oil with said materials in a closed cycle until reaction is complete; settling a material proportion of said materials out of said flow stream; adding a dry powdered absorbent material to said flow stream; circulating said oil with said absorbent material until the absorptive power of said material is substantially expended, and filtering all solid materials from said flow stream.

In witness that I claim the foregoing I have hereunto subscribed my name this 2nd day of July, 1929.

HUGH HARLEY CANNON.